United States Patent
Zhao et al.

(10) Patent No.: US 10,358,516 B2
(45) Date of Patent: Jul. 23, 2019

(54) METHOD FOR PREPARING POROUS HYDROGEL THROUGH FREEZING-ILLUMINATION

(71) Applicant: ZHEJIANG UNIVERSITY, Hangzhou, Zhejiang Province (CN)

(72) Inventors: Qian Zhao, Zhejiang Province (CN); Jingjun Wu, Zhejiang Province (CN); Tao Xie, Zhejiang Province (CN); Di Chen, Zhejiang Province (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 42 days.

(21) Appl. No.: 15/415,692

(22) Filed: Jan. 25, 2017

(65) Prior Publication Data

US 2017/0210864 A1 Jul. 27, 2017

(30) Foreign Application Priority Data

Jan. 26, 2016 (CN) .......................... 2016 1 0054637

(51) Int. Cl.
| | | |
|---|---|---|
| *C08F 220/18* | (2006.01) | |
| *C08G 65/48* | (2006.01) | |
| *C08J 3/075* | (2006.01) | |
| *C08J 3/28* | (2006.01) | |
| *C08J 9/28* | (2006.01) | |
| *C08F 220/40* | (2006.01) | |
| *C08F 220/56* | (2006.01) | |
| *C08F 220/58* | (2006.01) | |
| *C08F 220/60* | (2006.01) | |

(52) U.S. Cl.
CPC .......... *C08F 220/18* (2013.01); *C08F 220/56* (2013.01); *C08G 65/48* (2013.01); *C08J 9/28* (2013.01); *C08F 2220/1825* (2013.01); *C08J 3/075* (2013.01); *C08J 3/28* (2013.01); *C08J 2201/0484* (2013.01); *C08J 2205/022* (2013.01); *C08J 2333/10* (2013.01); *C08J 2333/26* (2013.01); *C08J 2371/08* (2013.01)

(58) Field of Classification Search
CPC ......... C08J 3/075; C08J 3/28; C08J 2205/022
See application file for complete search history.

(56) References Cited

U.S. PATENT DOCUMENTS 8,192,485 B2 *  6/2012  Ravi .......................... A61F 2/16
                                                              424/422

FOREIGN PATENT DOCUMENTS

EP         2740755 A1 *  6/2014  ............. B29C 73/00

OTHER PUBLICATIONS

Barrow, M. and Zhang H. "Aligned porous stimuli-responsive hydrogels via directional freezing and frozen UV initiated polymerization", Soft Matter, 2-13, 9, 2723.*
Oxyley et al., "Macropororous hydrogels for biomedical applications: methodology and morphology" Biomaterials, vol. 14 No. 14 1993.*

* cited by examiner

*Primary Examiner* — Melissa A Rioja
(74) *Attorney, Agent, or Firm* — Jiwen Chen

(57) ABSTRACT

The present invention discloses a freezing-illumination method for preparing porous gels, comprising the steps of: (a) synthesizing the gels containing dynamic exchangeable bonds; (b) illuminating the gels under frozen state by certain wavelength light source; (c) elevating the temperature and melt the ice crystals within the gels to get the porous structure. The dynamic exchangeable bonds existing in the gels include double/multi-sulfur bond, hydrazine bond, boronic ester bond. Catalyst is also included in the gel composition to activate the bond exchange reactions under illumination. This new method for preparing porous gels is easy to operate and suitable for most kinds of gels. Meanwhile, it can spatially control the pore structure within the gels by local illumination.

8 Claims, 3 Drawing Sheets

METHOD FOR PREPARING POROUS HYDROGEL THROUGH FREEZING-ILLUMINATION

This application claims the priority benefit of Chinese Application No. 201610054637.8 filed Jan. 26, 2016, which is hereby incorporated by reference.

TECHNICAL FIELD

The present invention relates to the field of new functional materials and, more particularly, to the preparation of a porous hydrogel by a freezing-illumination method.

BACKGROUND OF THE TECHNOLOGY hydrogels are kinds of crosslinked natural or synthetic polymer materials swollen in water. Because of the good performance in water absorption, water retention and delivery, gels are widely used in industrial, agricultural and medical fields (Qiu, Adv. Drug Deliver. Rev., 2001, 53: 321-339). Relevant products include contact lens, high absorbent resins, plant water retention agents and others.

A regular gel, with a mesh size in the range of several nanometers to tens of nanometers, is generally defined as non-porous. The absorbed water cannot flow freely inside the gel network macroscopically because of the strong interaction. By contrast, gels with pore size ranging from a few microns to hundreds of microns are usually termed as porous gels. The interconnected porous network results to large specific surface areas and high environment sensitivity. These properties benefits for the application in the industry such as wastewater treatment, immobilized enzyme reaction and microbial chromatographic separation (Mattiasson, Trends. Biotechnol., 2003, 21: 445-451).

There are many traditional porous gels preparation methods including phase separation, in situ foaming, using template and the freezing technique (Zhao, Soft Matter, 2008, 4:385-391). Porous gels prepared by phase separation have low porosity and small mesh size. In situ foaming process is difficult to control, so the porous gels have poor mechanical strength. As for using template, the inert template is different to completely remove. The freezing technique shows good performance in preparation of porous gels, because it can easy to regulate pore size, porosity and pore morphology without adding organic solvent or agent. The freezing technique includes cryopolymerization method and lyophilization-hydration method. Cryopolymerization is a method that polymerization of monomeric precursor below the solvent freezing point. During the process, the aqueous phase will freeze and the monomers aggregate together. After the polymerization and warming up, the ice crystals will melt to form porous structure (Lozinsky, Russ. Chem. Rev., 2002, 71:489-511). Conducting several cycles of lyophilization-hydration to a conventional non-porous gel can also introduce porous structure resulting from the destruction of the polymer network (Takahashi, Bull. Chem. Soc. Jpn., 1997, 70:1289-1295). Both the two freezing methods mentioned above have their shortcomings. For the cryopolymerization, it's not suitable for acidic monomers that can't polymerize at low temperature. As for the lyophilization-hydration method, although it can apply to all the conventional monomers, only low porosity and small pore can be obtained because of the elasticity of the gel network. Thus, there is a need for new methods that is able to decouple gel synthesis and porous-forming freezing, to permanently reshape the molecular chain sections opened by ice crystals and, to prevent the polymer network from recovering after the ice crystals melt.

SUMMARY OF THE INVENTION

The present invention discloses a freezing-illumination method for preparing porous hydrogels. The method decouples the gel synthesis and pore forming, so it can apply to nearly all the conventional synthetic or natural gel formulation, such as polyacrylamide, polyethylene glycol, gelatin methyl acrylate. It is an easy and efficient approach to control the pore structure. In addition, it can regulate the spatial distribution of the pore structure within a gel.

A freezing-illumination method for preparing porous gels, comprising the following steps:

(1) synthesizing the gels containing dynamic exchangeable bonds;

(2) illuminating the gels under frozen state by certain wavelength light source;

(3) elevating the temperature and melting the ice crystals within the gels to get the porous structure.

The freezing-illumination method disclosed in present invention is derived from the lyophilization-hydration method.

During the process of the conventional lyophilization-hydration method, the synthesized gel is frozen, and ice crystals form within the gel. The gel network is expanded by the ice crystals. Afterwards, the ice crystals are removed by freeze-drying method (lyophilization). Porous structures can be observed after the xerogel is rehydrated in water. This method decouples the gel synthesis and pore forming, so it can apply to nearly all the conventional synthetic or natural gel formulation. However, because of the elasticity of the polymer network, the expanded network will partially recover during the rehydration step, so only small pores and low porosity can be obtained.

In the present invention of freezing-illumination method, dynamic exchangeable bonds are introduced into the gel network. By illumination during the freezing process, the dynamic bonds exchange with each other in the network, thus rearrange the topological structures and release the internal stress induced by the ice crystal expansion. As a result, the pores will not shrink and diminish when rehydration in water, so larger pore size and higher porosity can be obtained.

Dynamic exchangeable bonds are covalent or physical bonds that can be activated under certain triggering conditions to exchange with each other. There is an equilibrium of bond break and formation in the polymer network. The triggering factor can be temperature, pH, ionic strength.

Advantageously, the dynamic exchangeable bonds can be chosen from double/multi-sulfur bond, hydrazone bond, boronic ester bond, azobenzene-based host-gest interaction bond.

In this disclosure, the gels can be any synthetic or natural polymer gels synthesized by the existing technology. The above-mentioned dynamic exchangeable bonds can be introduced into the polymer network in the form of functional monomers or polymer precursors.

Preferably, the gels can be synthesized by polymerization of acrylamide monomers and appropriate crosslinkers. The acrylamide monomers can be chosen from neutral monomers such as (methyl) acrylamide, N-isopropylacrylamide, N-Methylol acrylamide, Dimethylamino propyl methacrylamide, anion monomers such as 2-Acrylamido-2-methylpropane sulfonic acid (AMPS), cationic monomers such as (3-acrylamidopropyl) trimethylammonium chloride. A typical crosslinker is Bis-acrylamide.

Preferably, the gels can be synthesized by polymerization of (methyl) acrylate monomers and appropriate crosslinkers. The acrylate monomers can be chosen from 2-hydroxyethyl (methyl)acrylate, polyethyleneglycol acrylate, [2-(acryloyloxy)ethyl] trimethylammonium chloride, (methyl) acrylate sodium, (methyl) acrylic acid. Typical acrylate crosslinkers includes PEG diacrylate, ethyleneglycol dimethacrylate.

Natural polymers, such as gelatin, hyaluronic acid, dextran and chitosan can be modified with polymerizable acrylamide or acrylate groups grafted onto the main chains using the existing technology. The modified natural polymers can be homopolymerized or copolymerized with the conventional (methyl) acrylamide and (methyl) acrylate monomers to form the gel network.

The above-mentioned are hydrophilic monomers, they can absorb and retain water after crosslinked into networks. The solvent of the precursor solutions is water and can be easily frozen.

In some embodiments, hydrophobic monomers can also be used to fabricate porous organic gel using the present freezing-illumination method. In this case, organic solvents possessing high melting points should be used in order to be frozen under mild conditions. The available solvents include dimethylsulfoxide and dioxane. The hydrophobic monomers can be lauryl acrylate, octadecyl acrylate.

Catalysts should be included in the above-mentioned gel network to activate the dynamic bonds exchange reactions when being illuminated. The amount of the catalyst should be from 0 to 2% by weight of the dry gel weight.

When the dynamic exchangeable bond is double/multi-sulfur bond, the catalyst is photo-radical initiator. Advantageously, the photo-radical initiator can be chosen from 2-hydroxy-4 (2-hydroxyethoxy)-2-methyl propiophenone or α-ketoglutarate.

When the dynamic exchangeable bond is hydrazone, the catalyst is photobase generator. Advantageously, the photo-basic generator can be chosen from cobalt-ammonia complex, ketoxime ester, urethane, formamide, quaternary ammonium salts or triaryl methanol.

When the dynamic exchangeable bond is boronic ester bond, the catalyst is photoacid generator. Advantageously, the photoacid generator can be chosen from aryl onium salts or aryl diazonium salts.

The amount of the catalyst should be 0.05% by weight of the dry gel weight. Advantageously, the amount of the catalyst is 0.1-2% by weight.

The catalyst can be added to the gel precursor before gelation. The catalyst can also diffuse into the gel network by soaking a synthesized gel into the solution of catalyst.

When the dynamic exchangeable bond is azobenzene-based host-gest interaction bond, no catalyst is needed. The bond exchange reaction occurs directly under the illumination.

In the present invention of freezing-illumination method for preparing porous gels, the freezing-illumination process is the pore-forming step, and is independent with the gel synthesis step. The purpose of the illumination is to induce the catalyst to generate free radicals, lewis acid or basic to trigger the bond exchange reactions.

The wavelength of the illumination light varies according to the catalyst applied. In the illumination step (2), the wavelength of the light source is 200-470 nm, and the illumination time is 0.5 minutes-24 hours. For most of the catalyst mentioned above, the illumination wavelength falls in the range of 250-405 nm, which is mostly in the ultraviolet wave band. However, the illumination is totally determined by the catalyst. There are some radical initiator or photoacid/basic generators that can be triggered by longer wavelength light.

In the present invention of freezing-illumination method for preparing porous gels, the synthesized gel sample can be uniformly frozen or unidirectionally frozen. For the latter frozen sample, the final pore is directionally aligned. The frozen gel samples can be illuminated integrally or locally. For the later one, the obtained pores are locally distributed, determined by the photo mask applied.

The main principle of the present freezing-illumination method consists of two parts:

Micro phase separation induced by freezing process. The water (or organic solvent with high melting temperature) within the synthesized gels becomes ice crystals under the freezing temperature. In the meanwhile, the ice phase will separate from the polymer bulk phase. In another aspect, ice crystal will expand the polymer network leading to the large stress inside the gel networks. If warming up, the polymer network will recover after melting and gels will recover to the original non-porous structure.

Pore formation induced by photo illumination. By illumination during the freezing process, the dynamic bonds exchange with each other in the network, thus rearrange the topological structures and release the internal stress induced by the ice crystal expansion. As a result, the pores will not shrink and diminish when rehydration in water, so larger pore size and higher porosity can be obtained.

Comparing with the current technology, the advantages of the present invention are as follows:

The usable chemical components for the porous hydrogel have greatly enlarged. In the present invention, gels are synthesized before pore formation by freezing. Thus, the hydrogel can be synthesized under room temperature or heating, and can be synthesized by using organic solvent then using water to replace the organic solvent. Therefore, functional porous hydrogels can be made based on acid monomers or low water soluble monomers (such as super high mechanical strength porous hydrogel and super molecular identity porous hydrogel). These are not be achieved by the current freezing synthesis techniques.

Taking advantage of the spatial control of light illumination, pores well distributed within the gels can be achieved. Using a photo-mask can control the exposure areas so that bond exchange reactions will take place only in those areas. After melting, the exposed areas will form pore structure and the others recover to its original non-porous state. Further, the hydrogel with partial photo exposure can be rotated to a different angle and photo exposure can be done at a different dimension. Therefore, three dimensional controllable partial porous hydrogel,

DETAILED EMBODIMENTS OF THE PRESENT INVENTION

Figure 1:
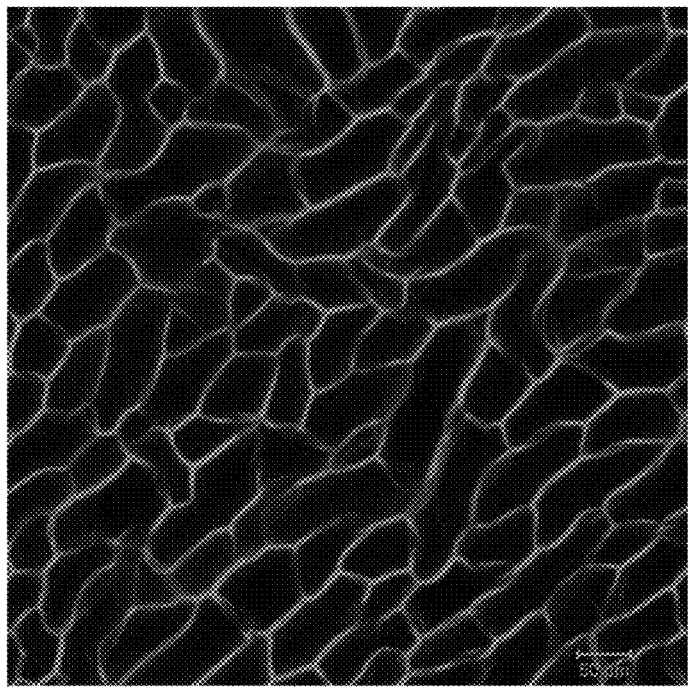
FIG. 1: the image of laser scanning confocal microscope for example 1.
Figure 2:
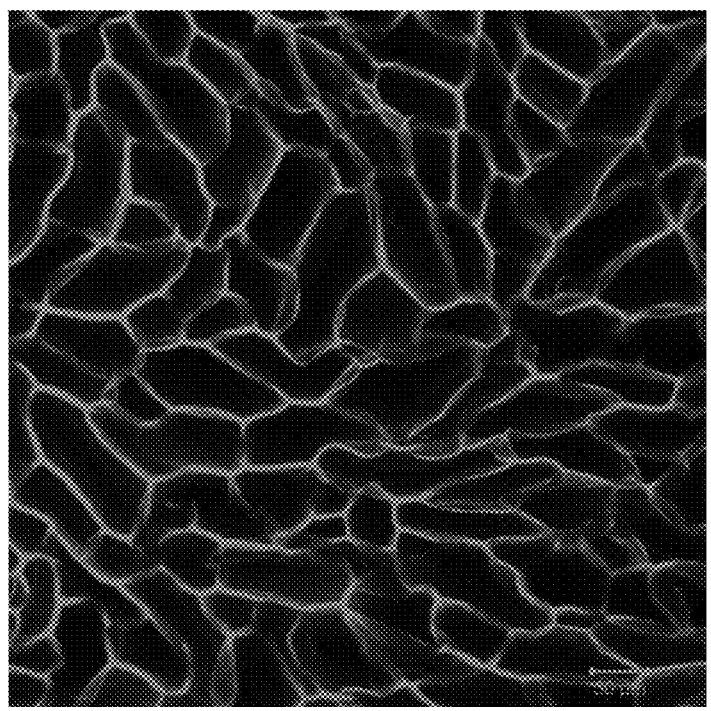
FIG. 2: the image of laser scanning confocal microscope for example 2.
Figure 3:
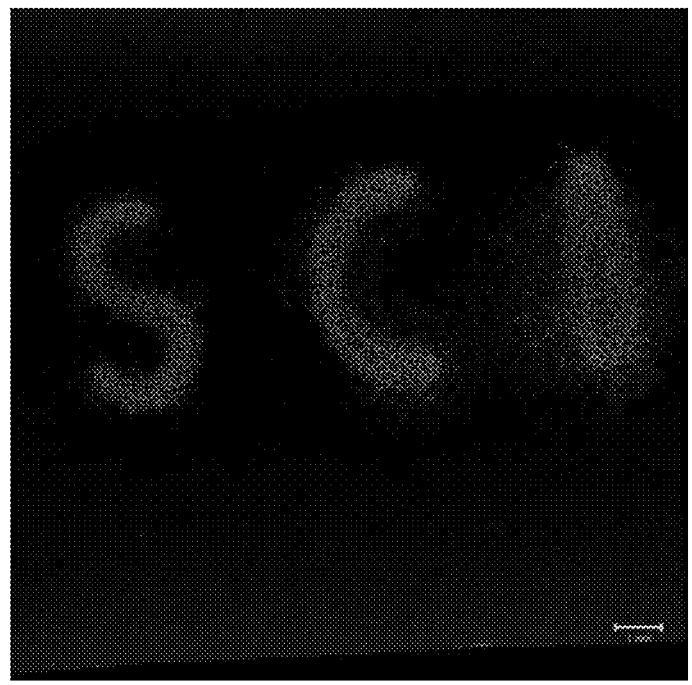
FIG. 3: the image of laser scanning confocal microscope for example 3.
Figure 4:
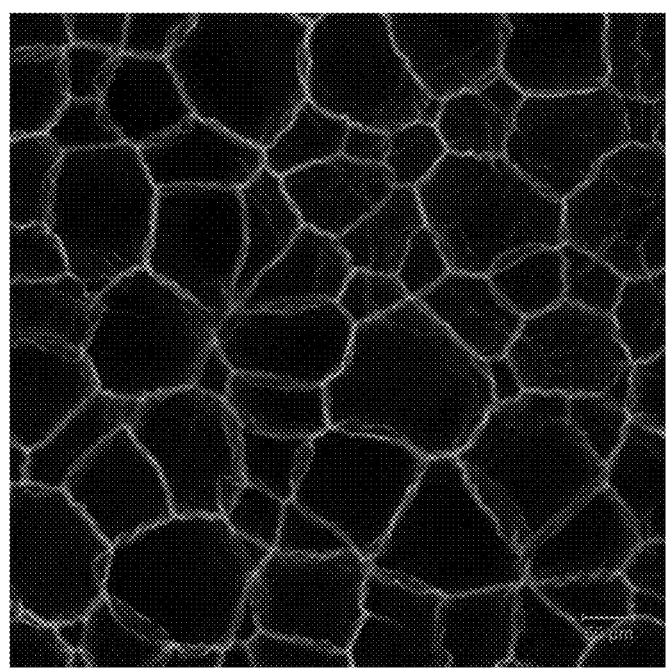
FIG. 4: the image of laser scanning confocal microscope for example 4.
Figure 5:
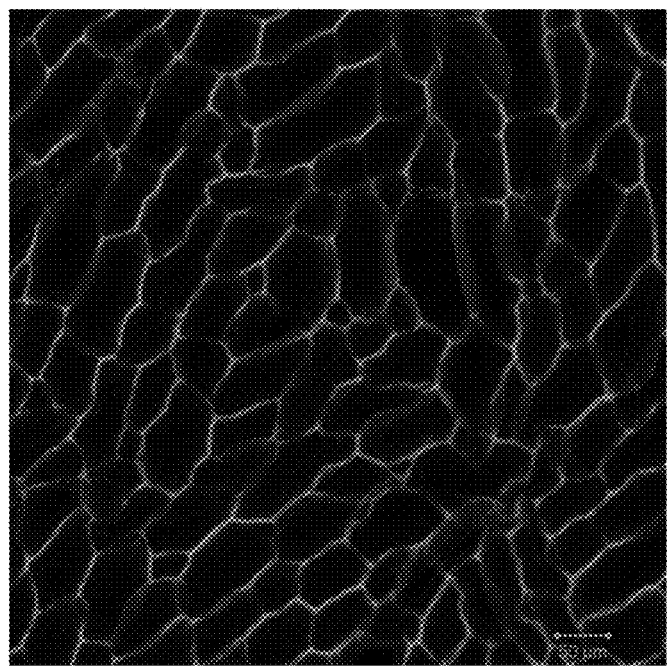
FIG. 5: the image of laser scanning confocal microscope for example 5.

A further illustration of the invention is made with examples. However, the protection scope of the present invention is not limited by these examples.

Example 1 (Disulfide Bond)

Materials: Acrylamide (AAm) and 2-hydroxy-4'-(2-hydroxyethoxy)-2-methyl propiophenone (12959) purchased from J&K. N,N'-bis(acryloyl) cystamine (BISAC) purchased from Alfa Aesar. Ammonium persulfate and N,N,N',N'-tetramethylethylenediamine purchased from Sinopharm.

Preparation: 500 mg acrylamide and 5 mg N,N'-bis(acryloyl) cystamine were dissolved in 5 ml deionized water. After fully dissolved, 100 μL ammonium persulfate and 10 μL N,N,N',N'-tetramethylethylenediamine were added into the solution. The solution was transferred to a sealed glass vessel quickly. 24 hour later, the resulting gel was immersed in a solution which contains the 2-hydroxy-4'-(2-hydroxyethoxy)-2-methyl propiophenone (photo-catalyst) for 24 h. The gel was frozen by a cooling stage. Under the freezing condition, the gel was exposed by UV irradiation integrally for 5 min. After thawing, the gel swelled in the deionized water to obtain porous gels. The laser scanning confocal microscope was applied to characterize the pore structure of the obtained gel.

Example 2 (Boronic Ester Bond)

Materials: m-acrylamido phenylboronic acid, and the structure was as follow:

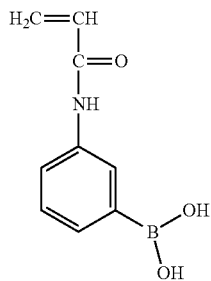

N-[Tris(hydroxymethyl)methyl]acrylamide was purchased from Alfa Aesar, and the structure as follow:

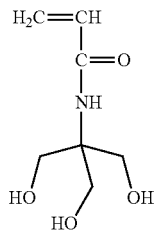

Acrylamide (AAm) was purchased from J&K. Ammonium persulfate and N,N,N',N'-tetramethylethylenediamine were purchased from Sinopharm. Diphenyliodonium nitrate was purchased from Aladdin.

Preparation: 446 mg acrylamide, 60 mg m-acrylamido phenylboronic acid and 55 mg N-[Tris(hydroxymethyl)methyl]acrylamide were dissolved in the 5 ml deionized water. After fully dissolved, 100 μL ammonium persulfate and 10 μL N,N,N',N'-tetramethylethylenediamine were added into the solution. The solution was transferred to a sealed glass vessel quickly. 24 hours later, the resulting gel was immersed in a solution which contains the diphenyliodonium nitrate (control the pH=10) for 24 hours. The gel was frozen by a cooling stage. Under the freezing condition, the gel was exposed by UV irradiation integrally for 5 min. After thawing, the gel swelled in the water to obtain porous gels. The laser scanning confocal microscope was applied to characterize the pore structure of the porous gel.

Example 3 (Hydrazine Bond, Locally Illumination)

Materials: Polyethylene glycol was terminated by benzoyl hydrazine (Mn=2000), and the structure was as follow.

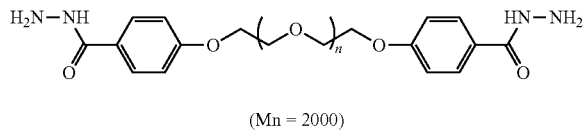

(Mn = 2000)

Tris[(4-aldehyde-phenoxy)-methyl] ethane, and the structure was as follow:

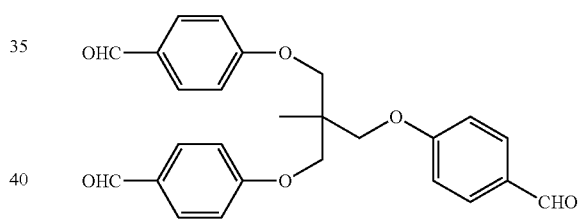

Tetraphenylborate quaternary ammonium (Photobase generator).

Preparation: 45.4 mg polyethylene glycol terminated by benzoyl hydrazine and 5.8 mg Tris[(4-aldehyde-phenoxy)-methyl] ethane were dissolved in the 1.0 ml dimethylsulfoxide. After fully dissolved, 0.5 μL acetic acid was added into the solution. The solution was transferred to a sealed glass vessel quickly. 24 hours later, the resulting gel was immersed in a solution which contains the photobase generator (control the pH<6) for 24 hours. The gel was frozen by a cooling stage. Under the freezing condition, the gel was exposed by UV irradiation using a photo mask with a "SCI" pattern for 5 min. After thawing, the gel swell in the water to obtain porous gels. The laser scanning confocal microscope was applied to characterize the pore structure of the porous gel.

Example 4 (Host-Gust Interaction)

Materials: Acrylamido cyclodextrin, and the structure was as follow:

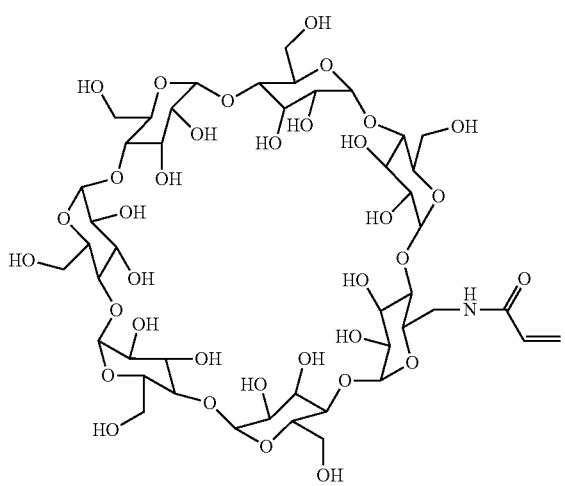 [SMILES: C=CC(=O)NCC1OC2OC3C(CO)OC(OC4C(CO)OC(OC5C(CO)OC(OC6C(CO)OC(OC7C(CO)OC(OC8C(CO)OC(OC1C(O)C2O)C(O)C8O)C(O)C7O)C(O)C6O)C(O)C5O)C(O)C4O)C(O)C3O]

Acrylamido azobenzene, and the structure was as follow:

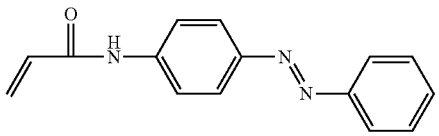 [SMILES: C=CC(=O)Nc1ccc(/N=N/c2ccccc2)cc1]

Acrylamide (AAm) purchased from J&K. Ammonium persulfate and N,N,N',N'-tetramethylethylenediamine purchased from Sinopharm.

Preparation: 100 mg acrylamide, 60 mg acrylamido cyclodextrin and 10 mg acrylamido azobenzene were dissolved in the 5 ml deionized water. After fully dissolved, 100 μL ammonium persulfate and 10 μL N,N,N',N'-tetramethylethylenediamine were added into the solution. The solution was transferred to a sealed glass vessel quickly. 24 hour later, the resulting hydrogel was immersed in the deionized water for 24 hours. The hydrogel was frozen by a cooling stage. Under the freezing condition, the hydrogel was exposed by UV irradiation integrally for 5 min. After thawing, the hydrogel swelled in the water to obtain the porous hydrogels. The laser scanning confocal microscope was applied to characterize the pore structure of the porous gel.

Example 5 (Hydrophobic Monomer)

Materials:

butyl methacrylate (BA) purchased from sigma-aldrich and phenyl bis(2,4,6-trimethylbenzoyl)-phosphine oxide (819) purchased from J&K. N,N'-bis(acryloyl) cystamine (BISAC) purchased from Alfa Aesar.

Preparation: 500 mg butyl methacrylate and 5 mg N,N'-bis(acryloyl) cystamine were dissolved in 5 ml dimethyl sulfoxide. After fully dissolved, 4 mg ammonium persulfate and 10 μL N,N,N',N'-tetramethylethylenediamine were added into the solution. The solution was transferred to a sealed glass vessel quickly. 24 hours later, the resulting gel was immersed in a dimethyl sulfoxide solution which contains the phenyl bis(2,4,6-trimethylbenzoyl) phosphine oxide (photo-catalyst) for 24 hours. The gel was frozen by a cooling stage. Under the freezing condition, the gel was exposed by UV irradiation integrally for 5 min. After thawing, the gel swelled in the dimethyl sulfoxide to obtain porous gels. The laser scanning confocal microscope was applied to characterize the pore structure of the obtained gel.

The invention claimed is:

1. A freezing-illumination method for preparing a porous hydrogel, the method comprising the following steps in the following order:
   (a) synthesizing by polymerization a gel containing exchangeable bonds under room temperature or heating and using water as solvent;
   (b) freezing the gel containing exchangeable bonds to prepare a gel containing exchangeable bonds in a frozen state, and illuminating the gel containing exchangeable bonds in the frozen state by a light source so that the exchangeable bonds contained therein exchange; and
   (c) exposing to an elevated temperature the gel containing exchangeable bonds in the frozen state to melt ice crystals therein to obtain the porous hydrogel.

2. The method of claim 1, wherein the exchangeable bonds are selected from at least one of the following: bonds between two or more sulfur bonds, hydrazine bonds, boronic ester bonds, and host-guest interaction bonds.

3. The method of claim 1, wherein the porous hydrogel comprises a catalyst which can activate the exchangeable bonds when the catalyst is illuminated with a light source; and wherein the amount of the catalyst ranges 0.05-5% by weight of all dry ingredients in the porous hydrogel.

4. The method of claim 1, characterized in that:
   the exchangeable bonds are bonds between two or more sulfur atoms and the porous hydrogel further comprises a photo-radical initiator as a catalyst; or
   the exchangeable bonds are hydrazine bonds and the porous hydrogel further comprises a photo-base generator as a catalyst; or
   the exchangeable bonds are boronic ester bonds and the porous hydrogel further comprises a photo-acid generator as a catalyst; or
   the exchangeable bonds are host-guest interaction bonds and the porous hydrogel does not comprise a catalyst.

5. The method of claim 3, wherein addition of the catalyst includes in situ introduction during step (a) or diffusion into the gel containing exchangeable bonds after step (a).

6. The method of claim 1, wherein wavelength of the light source is 200-470 nm, and illuminating occurs for is 0.5 min-24 hours.

7. The method of claim 1, wherein the illuminating includes is uniform irradiation or local irradiation by a mask.

8. The method of claim 1, wherein, in step (b), freezing includes uniformly freezing or directionally freezing.

* * * * *